United States Patent
Kuriyan

(10) Patent No.: US 12,199,768 B2
(45) Date of Patent: Jan. 14, 2025

(54) METHOD AND SYSTEM FOR GUARANTEEING RELIABILITY AND DATA TRANSFER DELAY RANGE FOR DATA APPLICATIONS REQUIRING SYNCHRONIZED DATA TRANSFER BETWEEN SENDER AND RECEIVER OVER A CELLULAR NETWORK

(71) Applicant: George W. Kuriyan, Kapolei, HI (US)

(72) Inventor: George W. Kuriyan, Kapolei, HI (US)

(73) Assignee: George W. Kuriyan, Kapolei, HI (US)

( * ) Notice: Subject to any disclaimer, the term of this patent is extended or adjusted under 35 U.S.C. 154(b) by 0 days.

(21) Appl. No.: 17/889,438

(22) Filed: Aug. 17, 2022

(65) Prior Publication Data

US 2024/0063947 A1   Feb. 22, 2024

(51) Int. Cl.
*H04L 1/08* (2006.01)
*H04W 28/02* (2009.01)

(52) U.S. Cl.
CPC ........... *H04L 1/08* (2013.01); *H04W 28/0236* (2013.01)

(58) Field of Classification Search
CPC .............................. H04L 1/08; H04W 28/0236
USPC .......................................................... 714/750
See application file for complete search history.

(56) References Cited

U.S. PATENT DOCUMENTS

| | | | |
|---|---|---|---|
| 8,787,202 B2 | 7/2014 | Kuriyan | |
| 2004/0224712 A1* | 11/2004 | Tiedemann, Jr. | H04W 72/23 455/518 |
| 2007/0201406 A1* | 8/2007 | Yoon | H04L 5/023 370/335 |
| 2017/0141880 A1* | 5/2017 | So | H04N 21/236 |
| 2017/0288742 A1* | 10/2017 | Huang | H04L 1/18 |
| 2019/0273581 A1* | 9/2019 | Zhu | H04W 72/542 |
| 2021/0345169 A1* | 11/2021 | Wang | H04W 74/0816 |
| 2021/0360448 A1* | 11/2021 | Kim | H04W 76/28 |
| 2022/0386165 A1* | 12/2022 | Liu | H04W 76/14 |

* cited by examiner

*Primary Examiner* — James C Kerveros
(74) *Attorney, Agent, or Firm* — Calderone McKay, LLC

(57) ABSTRACT

A method and system for ensuring reliability and delay of data communication using duplicate messages and degradation feedback to ensure accuracy of transmission of the messages in a network. Duplicate messages are sent after a delay period from sending of an original message. The delay time period can be automatically set to be adjusted after a predetermined number of messages are sent. Degradation feedback can be determined from statistics, including duplicate messages completion, fault tolerance and data retransmission to automate the delay time period and sending of duplicate messages. A message is sent to a network control center when degradation occurs.

16 Claims, 12 Drawing Sheets

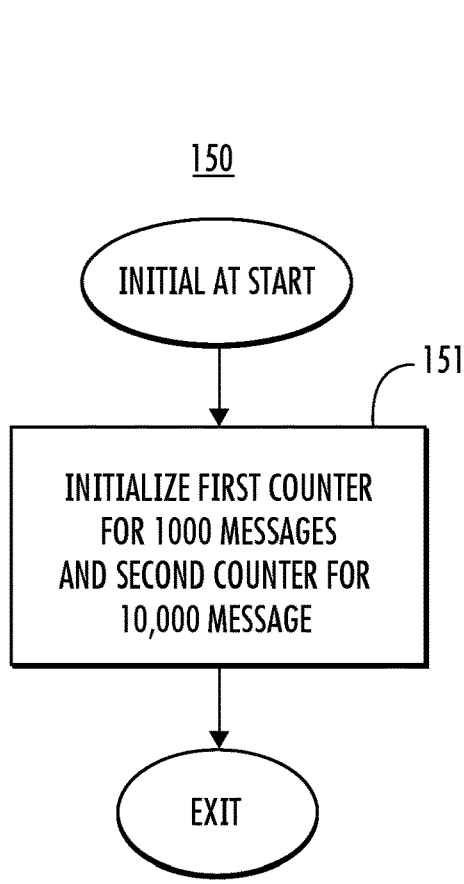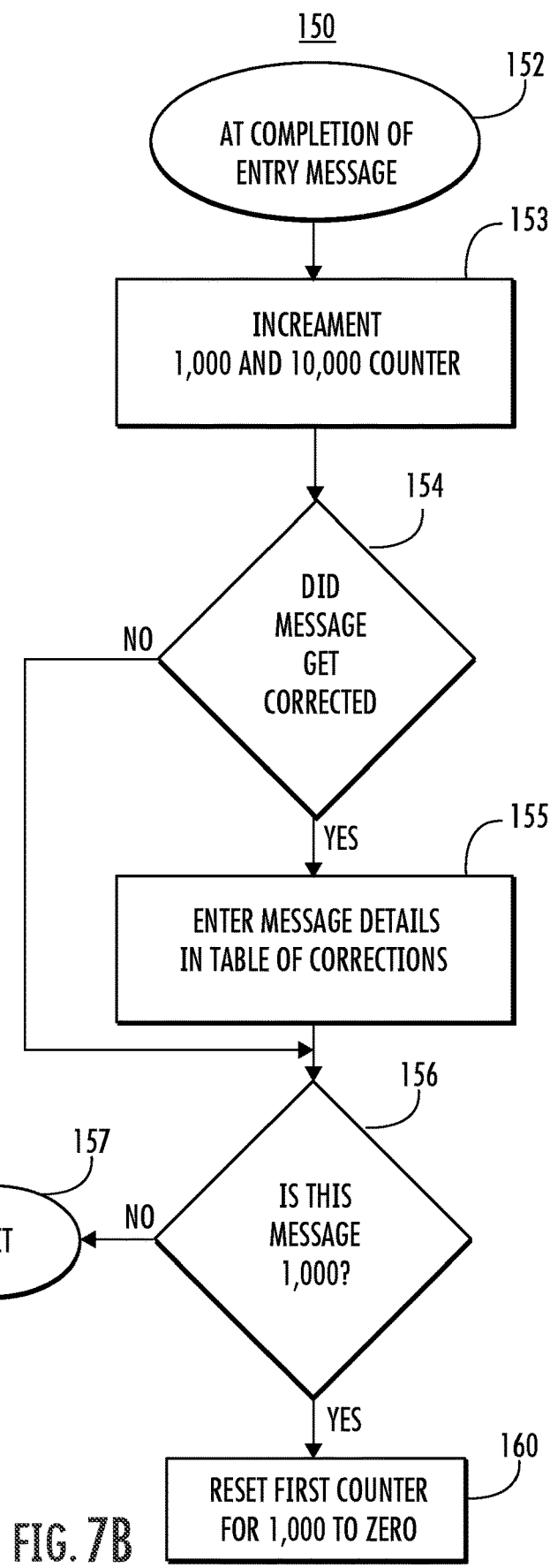

METHOD AND SYSTEM FOR GUARANTEEING RELIABILITY AND DATA TRANSFER DELAY RANGE FOR DATA APPLICATIONS REQUIRING SYNCHRONIZED DATA TRANSFER BETWEEN SENDER AND RECEIVER OVER A CELLULAR NETWORK

BACKGROUND OF THE INVENTION

Field of the Invention

The present invention in general is a method and system to provide high reliability for precision communications and real-time data applications using a cellular network.

Description of Related Art

Current Cellular data networks are not capable of providing connectivity for critical real-Time data applications that require high data reliability and precision. These applications are characterized by the need for high reliability and high precision in data communications having error rates of less than one error in 1 million messages for the applications and supporting a large number of data points as clusters.

U.S. Pat. No. 8,787,202 ("the '202 patent") describes maintaining the reliability of wireless communications medium at high reliability of less than about 1 error in substantially 1 million to 5 million messages. The '202 patent requires four data transmissions to complete a highly accurate message with synchronization between the sender and receiver. With one message transmission taking 5 to 10 milliseconds, the transmission time can be 40 to 50 milliseconds for one message. The data transmission capability of less than 1 error in 1 million messages is a necessary criterion to run high-reliability data applications. It is not, however, sufficient for such real-time applications if very precise process control without unwanted harmonic frequencies is required. Unwanted harmonic frequencies are generated if there are random variations in the delay from one message to another.

Typical very high-reliability applications could need data scanned at periodic intervals of around 3 to 5 seconds and sent to a control center for both display and feedback operation. The '202 patent describes how the delay in the receipt of data at the destination affects the process that is being controlled. The '202 patent teaches how the delay brings about a phase Lag and such a phase lag can be compensated by a phase gain circuit in the scanning. However, if the delay has random fluctuations from one message to another, then that introduces unwanted harmonic frequencies in the process that is being controlled.

One way to reduce the probability of long and random delays occurring is to transmit duplicate messages and then accept the earliest completed message. This approach has the shortcoming of having a cost associated with it. It uses excessive cellular network capacity as well as computing resources in the sender and receiver systems.

It is desirable to provide a method and system for using duplicate messages for accuracy and assurance of receipt at the receiving system without the excessive use of the cellular network capacity. It is also desirable to provide a method and system to guarantee that the message delay for a real-time data application operates in a specified range of delays and provide feed-back criteria for network management for guaranteed network performance.

SUMMARY OF THE INVENTION

The present invention relates a method and system to guarantee the operation of real-time data applications in a specified range of message delays. In particular the present invention relates to a method and system for guaranteeing reliability and data transfer delay range for high reliability and high precision real-time data applications requiring synchronized data transfer between a sender and a receiver over a controlled cellular network that has inherent packet losses and random errors and delays with very low maintenance requirements. The network performance requirement can be achieved using the present invention over a 4G or 5G cellular network that has at the least, capability to provide on average error-free message transmission for approximately one error in 1,000 messages in the physical area of the real-time data applications. Additionally, if a 4G or 5G cellular network at a location has drifted away from a performance norm of at least one error in 1,000 messages, then the method and system of the present invention assure that the network could be brought into compliance with at least one error in 1,000 messages. The present invention provides necessary and sufficient criteria for using 4G or 5G cellular networks for high-reliability real-time data applications with a guaranteed maximum delay. Additionally, the present invention provides necessary data diagnostics to assure compliance of a 4G or 5G cellular network for high-reliability applications.

The cellular network capacity used for sending duplicate messages can be minimized by using a delay time period before sending the duplicate message. In one embodiment, an original message is sent. A sending cluster waits for a time period exceeding a time period for the original message completion. After the time period is finished, a duplicate message is sent. Before the duplicate message completes its message transmission process, the original messages can complete. At that time the duplicate message processing is terminated. This approach saves cellular network usage compared to when the duplicate message is initiated at the same time as the original message is started.

In one embodiment, the delay time period can be automatically set to be adjusted after a predetermined number of messages are sent, such as for example 1,000 messages, in order to minimize the initiation of the sending of the duplicate message. In one embodiment, statistics, such as duplicate message completion, fault tolerance, and data retransmission, are collected and sent after a predetermined number of messages. The statistics can be used to automate the delay time period and sending of duplicate messages. The collected statistics can be used to maintain the cellular network at the clusters within a predetermined error rate such as for example less than 1 error per 1,000 messages.

In the method of the present invention for every 10,000 messages, the network parameters are adjusted, if necessary, by the cellular network control management to allow the present invention to perform without degradation. When a 4G or 5G network is performing without degradation, it is operating at less than one error per million messages. The wireless medium is stochastic in nature and periodically, degradation for a short duration occur. When a 5G or 4G cellular network is operating without the capabilities of the present invention, the degradation in the network causes the messages to fail. Accordingly, the effective error rate of conventional 4G and 5G cellular networks is approximately one error or more in 1,000 messages.

In order for a real-time data application that requires high precision and high reliability over such a cellular network, the service provider has to guarantee an error requirement that the specific application will encounter only less than one error in 1 million messages. An example of applications where such error requirement in data connectivity is needed can include smart electrical power grids. The sources of data for these grids include for example wind power farms, solar energy farms, individual solar installations and the like. The data sources introduce very high variability in the electricity flows over the transmission network requiring quick and accurate control actions in real-time. High reliability and high precision is needed in all elements of the smart electrical power grids.

Another example of applications where such an error requirement in data connectivity is needed can include smart roadways and highways. A large number of data sources for road conditions can be needed for road management and traffic management in real-time. Other examples of applications where such an error requirement in data connectivity is needed in real-time can include: oil refineries; chemical plants; marine applications, including aircraft carriers where cellular data back-up is needed and ship applications; military bases and applications; airport operations and seaport operations. The data applications can include an artificial intelligence interface and simulation capability. The present invention ensures smooth interfacing to such capabilities.

The invention will be more fully described by reference to the following drawings.

BRIEF DESCRIPTION OF THE DRAWINGS

FIGS. 7A-7D are flow diagrams of a method for determining network degradation of the present invention.

Figure 1:
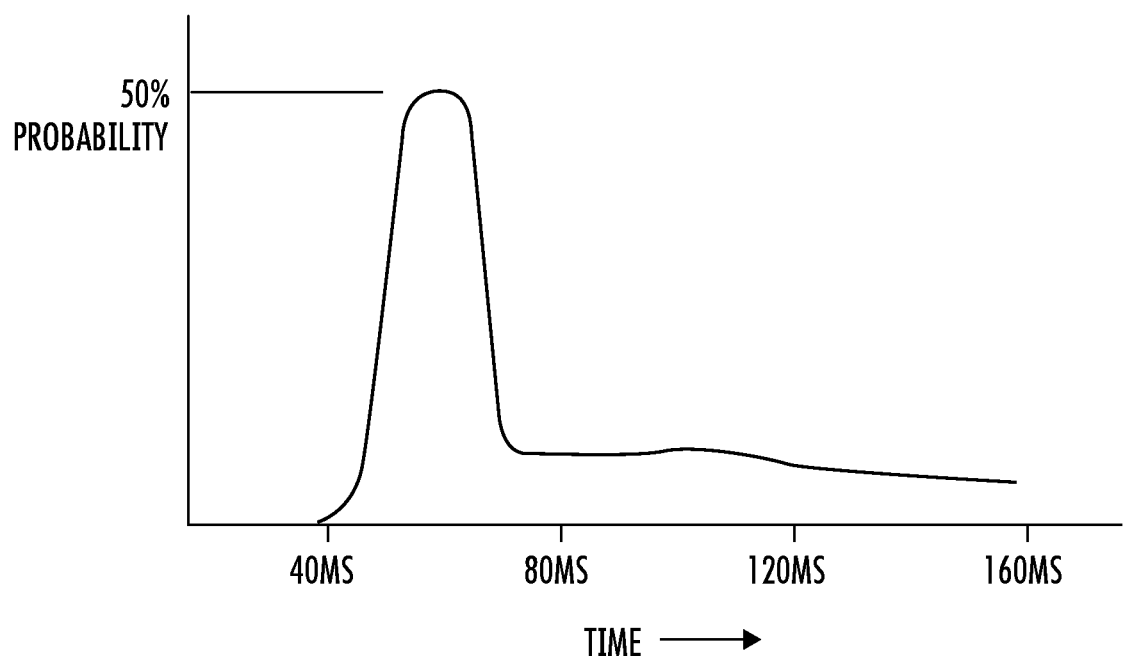
FIG. 1 is a graph of a probability distribution of a message response time.

Embodiments of the present disclosure and their advantages are best understood by referring to the detailed description that follows. It should be appreciated that the figures may not be necessarily drawn to scale.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Timing studies indicated that in a 4G network, over a large number of messages, for example over 1,000 messages, about 50% to about 60% of the messages took less than about 50 milliseconds, about 20% to about 30% of messages took less than about 100 milliseconds and about 5% of the messages took about 150 milliseconds or more for transmission. Additionally, a small number of the messages did not complete at all. The messages that did not complete required retransmission of the message as a failed message in order for the message to be sent properly. The probability distribution of message response time is shown below in FIG. 1.

The present invention includes a method for sending duplicate messages to ensure the accuracy of transmission of messages in a network. The cellular network capacity used for sending duplicate messages can be minimized by using a delay time period before sending of the duplicate message. In one embodiment, a sending cluster waits for a time period exceeding a typical message completion of an original message and then sends the duplicate message. For example, the time period can be determined to be about 60% of messages use. In one embodiment, original messages are determined to use about 40 milliseconds and about 80% of the typical messages use less than about 80 milliseconds. In one embodiment, a duplicate message can be sent at about 60 milliseconds, so that only about 20% of messages are not completed. Before the duplicate message completes its message transmission process, many original messages will complete. At that time the duplicate message processing is terminated. By this approach, only about 5 to about 10% of the initial original messages will not complete before the duplicate message completes. This approach saves about 80% to about 90% of the cellular network usage than if the duplicate message is initiated at the same time as the original message is started.

Figure 2:
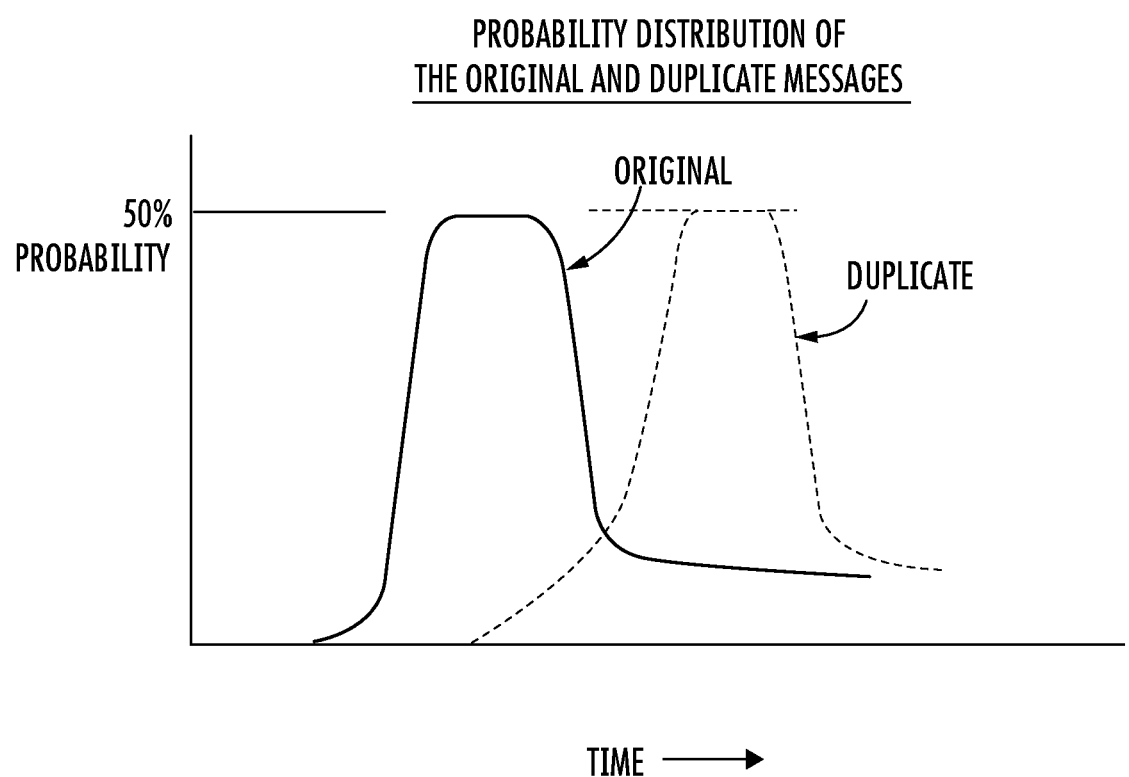
FIG. 2 is a graph of a probability distribution of an original message and a duplicate message.

FIG. 2 illustrates the probability distribution of the original message and duplicate message with a delay.

Figure 3:
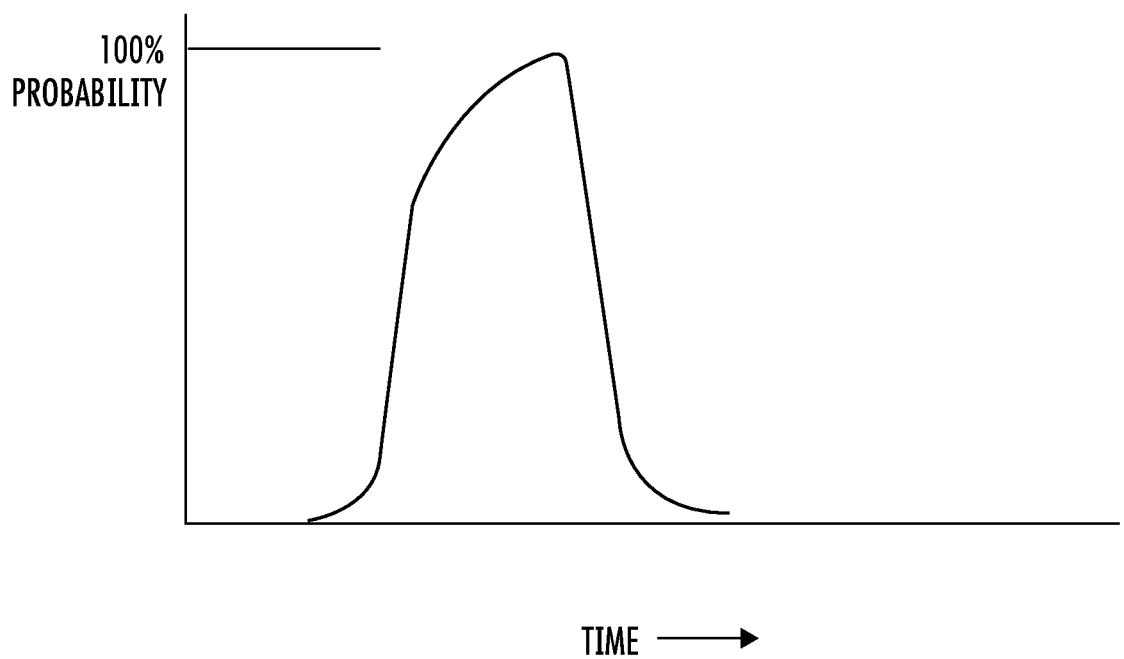
FIG. 3 is a probability distribution of at least one original message or duplicate message completing.

From the probability distribution shown in FIG. 2, the probability of at least one message completing can be determined. The probability of at least one message completing is shown in FIG. 3. This method of the present invention guarantees the receipt of the information within a specified time as follows:

Guaranteed Message Delivery Time=normal delivery time+the Delay for initiating the duplicate message.

Figure 4:
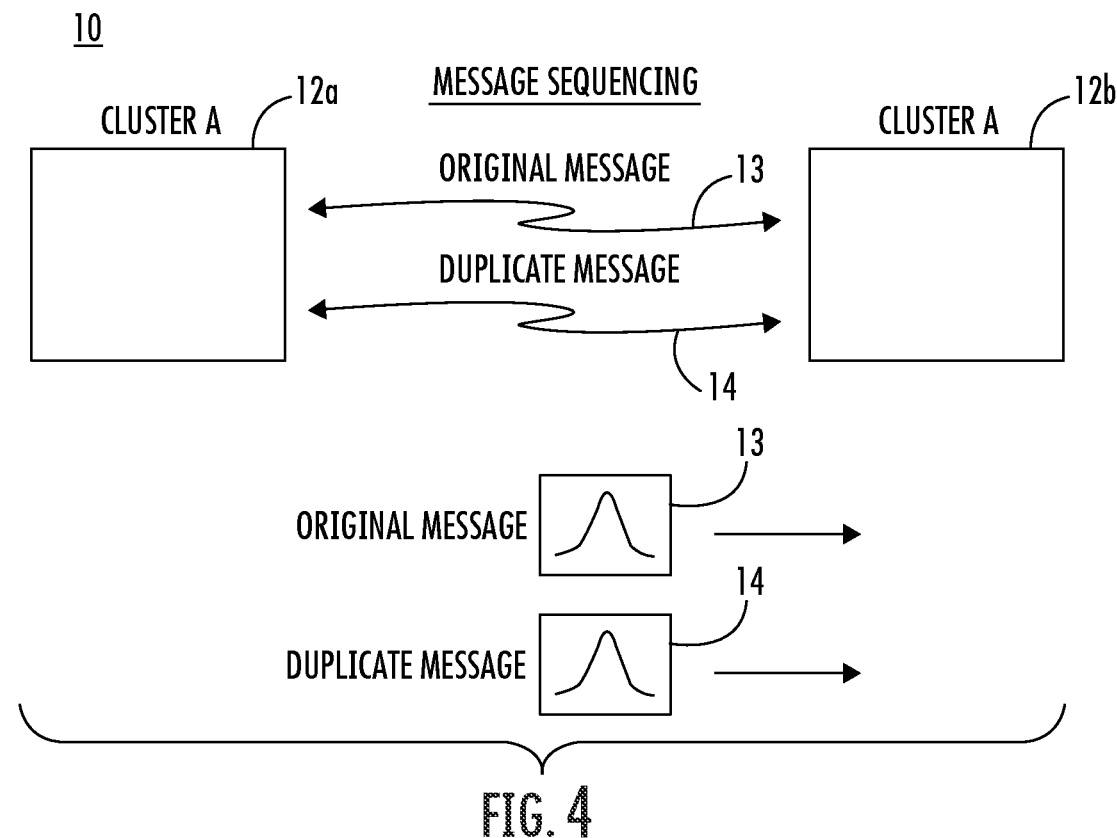
FIG. 4 is a schematic diagram of a system of the present invention including message sequencing of original and duplicate messages.

FIG. 4 illustrates system 10 for sending duplicate messages to ensure accuracy of transmission of messages in a network. Cluster 12a of data points sends messages to cluster 12b. Each cluster 12a, 12b is connected to several data points for sending data periodically to other clusters. Clusters 12a, 12b can send original messages 13 and duplicate messages 14 using wireless communications 25. For example, wireless communications 25 can be a wireless packet data network, Internet connection or other wireless-based connection, including 4G and 5G cellular networks.

Figure 5A:
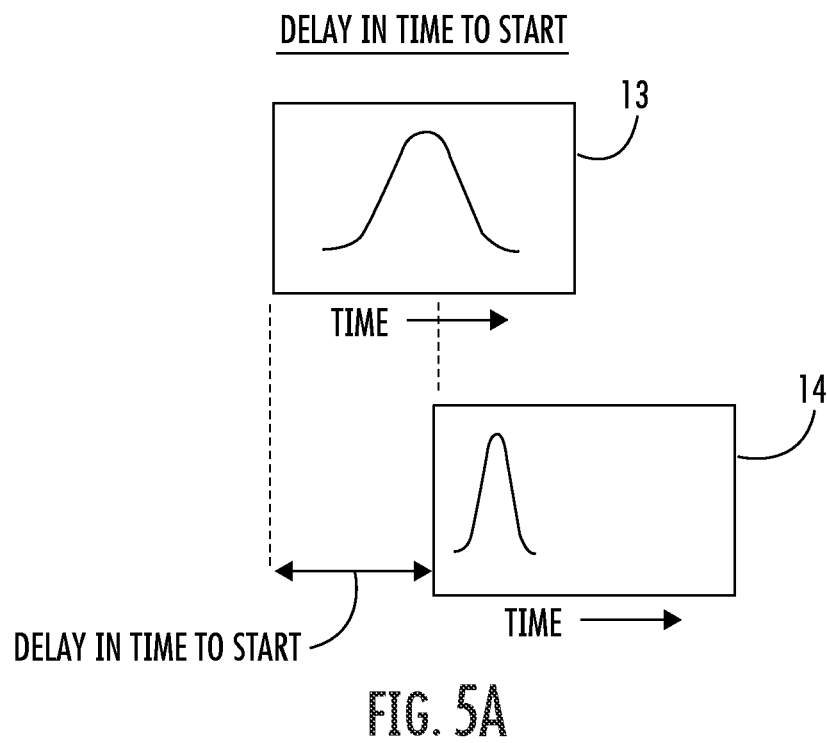
FIG. 5A is a schematic diagram of a delay time for sending the duplicate message in the present invention.
Figure 5B:
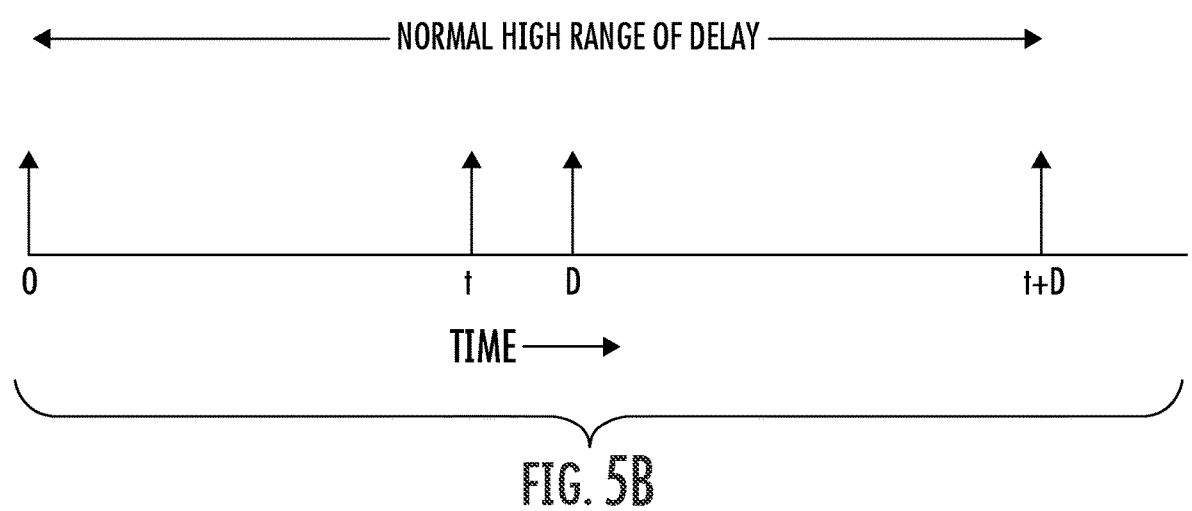
FIG. 5B is a schematic diagram of a maximum delay time for sending the duplicate message in the present invention.

Duplicate message 14 can be sent after a pre-determined delay in time as shown in FIG. 5A. FIG. 5B illustrates a maximum delay time for sending duplicate message 14. The probability of the Duplicate Message completing in around the normal time, t is over 50%. The probability of the original message completing in t+D time could be over 90%.

Therefore, there is a 95% or more probability that the message, either the original or duplicate completes in this time.

Figure 6:
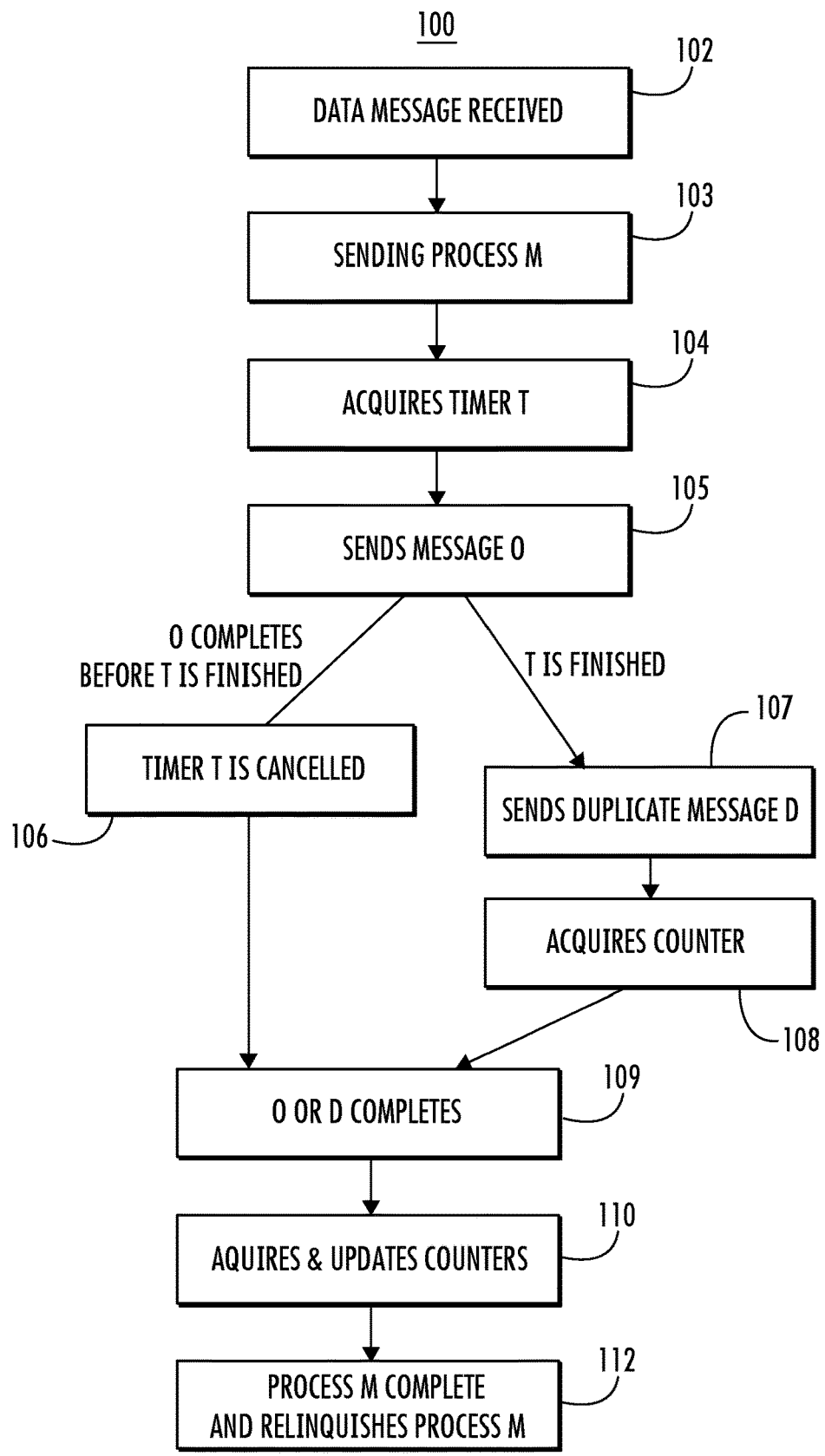
FIG. 6 is a flow diagram of a method for sending duplicate messages to ensure accuracy of transmission of messages in a network of the present invention.

FIG. 6 illustrates a method for sending duplicate messages to ensure accuracy of transmission of messages in a network which can be implemented by system 10. In block 102, as original data message is initiated. Referring to FIG. 4, original data message 13 is initiated by cluster 12a. Original data message 13 can be a real time message. Referring to FIG. 6, when the original data message is initiated, message sending process (M) is initiated in block 103. Message sending process (M) can be a software process.

In block 104, message sending process (M) acquires a timer (T) and initiates timer T. Timer T can be implemented as shown below:

$$T=1.6\times[4\times t]=\text{Approximately 60 to 70 Milliseconds},$$
where $t$=the time to send a single transmission.

Referring to FIG. 4, system 10 is expected to operate in an environment where sufficient excess capacity of wireless communications 25, such as the cellular network is available. This means that the error rate is equal to or less than one error in 1,000 messages. Prototype and Simulation studies have shown that system 10 can operate sufficiently in an environment of about 10% errors. If the error rate of the cellular network becomes excessive, such as about 25% errors, then there is a non-trivial probability that system 10 can become unstable due to overload on wireless communications 25 of the cellular network and computing power of system 10. In order to avoid that possibility, a bit error rate (BER) of system 10 can be adjusted early before system 10 becomes unstable so that the error rate is kept less than about 5% errors. When the system 10 is operating at one error in 1,000 messages, the probability of failure for the message is less than one in 1 million messages (one in 1,000×one in 1,000). This probability becomes 1% if the error rate is 10% (10%×10%). Accordingly, it is advantageous that the error rate of the network is kept as much as possible to less than one error in 1,000 messages.

The normal high range of the delay is the normal time to complete a message+the time to start of the duplicate message in a network operating at less than one error in 1,000 messages. Even if the original message is delayed, there is over 90% probability that the duplicate Message is encountering only the normal time to complete the message. This is shown in FIG. 5B.

Figure 8:
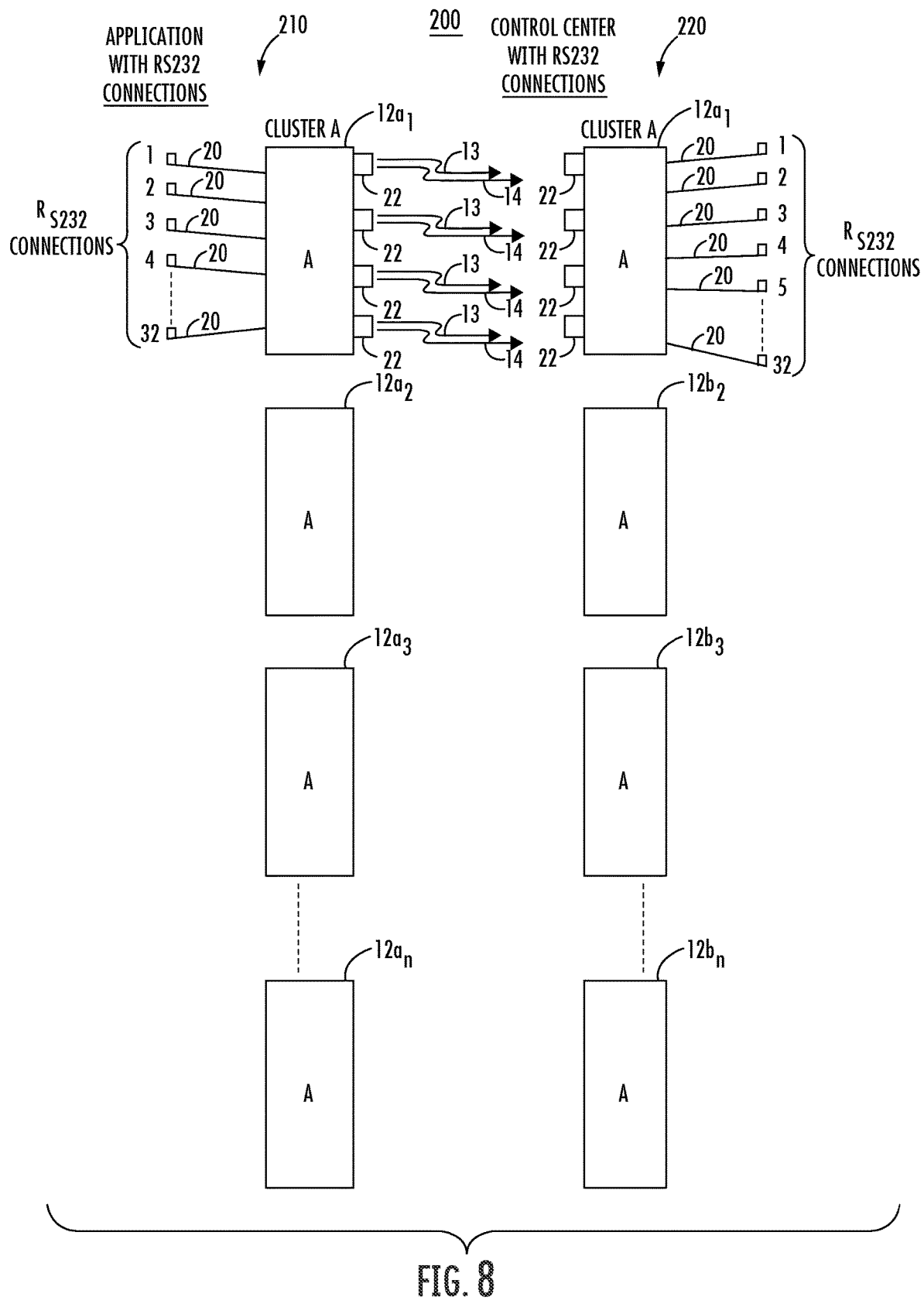
FIG. 8 is a schematic diagram of a system of the present invention including a plurality of clusters.

In one embodiment, the error correction by system 200 shown in FIG. 8 is analyzed to see whether the network error rate is approaching 5%. If so, network control center 220 is notified, and system 200 expects that the error rate is brought below 5% and preferably at around one error in 1,000 messages. An embodiment for an automatic updating of error correction is shown below:

In block 105, message sending process(M) sends original message 13, referred to as original message O, to a destination. The destination can be cluster 12b as shown in FIG. 4. Referring to FIG. 6, if the original message O completes before timer T finishes t, the timer T is canceled in block 106. If the original message O has not completed before the timer T finishes, a duplicate message 14, referred to as duplicate message D, is sent without initiating a timer in block 107. In block 108, message sending process M acquires a counter for its use and updates a total message counter of the sending cluster. The sending cluster can be cluster 12a as shown in FIG. 4.

Referring to FIG. 6, in block 109, if either the original message O or the duplicate message D completes, then message sending process M terminates the respective message that has not completed, either original message O or duplicate message D. In block 110, the counter for the message sending process M and the total message counter for the sending cluster is updated. In block 112, if message-sending process M has completed, an update is sent to a sending application of the cluster, and message-sending process M is relinquished back to an operating system of the cluster for assignment to new process requests.

In one embodiment, system degradation parameters comprising the number of times fault tolerance is used to send correct data, the number of times that retransmission of original message 13 was needed, and the number of times that duplicate message 14 transmission was needed are sent to a network control center for network management according to FIGS. 7A-7D.

Figure 7C:
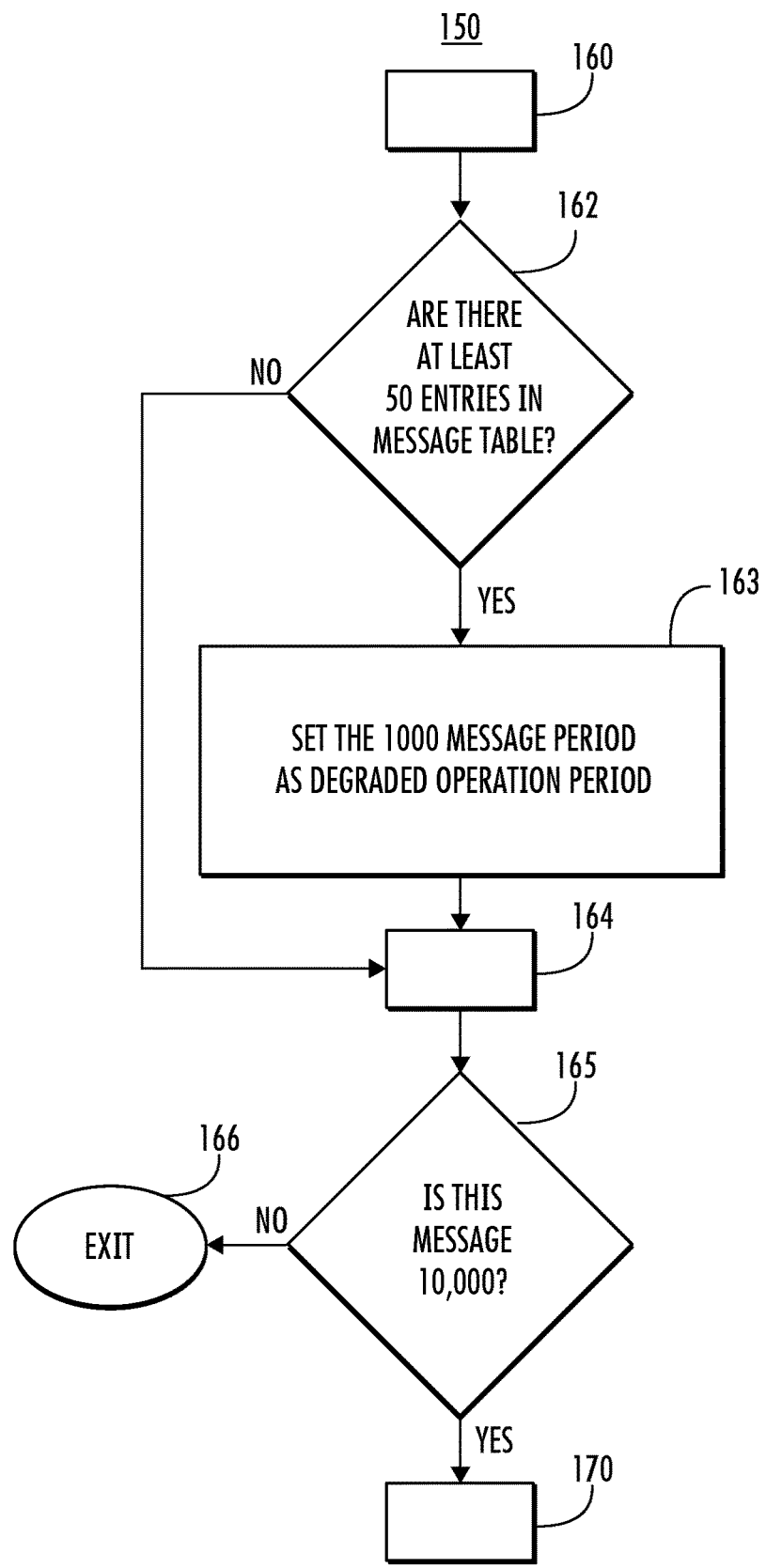

In method for determining network degradation 150 three counters subsets are used on a continuous basis, as shown in FIGS. 7A-7D. Referring to FIG. 7A, in block 151, a first counter 61a is initialized to an interim message value, for example 1,000 messages. A second counter 61b is initialized to a long-term performance value, for example 10,000 messages. First counter 61a can be referred to as Interim Message Counter (IMC). Second counter 61b can be referred to as Long Term Performance Analysis Counter (LTPAC). The messages can be RS232 messages.

Referring to FIG. 7B, At the completion of every message in block 152, first counter 61a and second counter 61b are incremented in block 153. In one embodiment, first counter 61a is incremented until the interim message value of 1,000 messages are completed and second counter 61b is incremented until the long term performance value of 10,000 messages are completed. First counter 61a is incremented when a message completes from a source to a destination. A decision is made in block 154 to determine if the message has been corrected. In this context, a correction means that the methods of '202 Patent or that a duplicate message 14 was used to make the message acceptable. Alternatively, correction can be performed by methods described in U.S. Pat. No. 8,787,202 hereby incorporated by reference into this application. When it is determined the message was corrected, message details are entered into a table of corrections in block 155. When it was determined that the message was not corrected or after block 155 is completed, a decision is made in block 156 to determine if the message is the interim message value of the 1,000 message. When it is determined the message is not the interim message value of the 1,000 message, block 157 is executed to exit and return to block 152. When it is determined that first counter 61a was incremented until the interim message value of 1,000 of the messages were completed, block 160 is executed and counter 61a is reset to zero.

Referring to FIG. 7C, after the interim message value of 1,000 messages were completed, a decision is made in block 162 to determine if there are at least a minimum value of entries in a table of corrections. For example, the minimum entries in the message table can have a value of 50. When it is determined that there are at least the minimum entries in the table of corrections, block 163 is executed to set the interim message period of 1,000 messages as a degraded operation period. After block 163 and when it is determined that there are not at least the minimum value of entries in the message table the messages are forwarded by block 164 to block 165. In block 165, a decision is made to determine if the message is the long term performance value of 10,000.

When it is determined the message is not the long-term performance value of the 10,000 messages, block 166 is executed to exit and return to block 160. When it is determined that second counter 61b was incremented until the interim message value of 10,000 of the messages were completed, block 170 is executed.

Figure 7D:
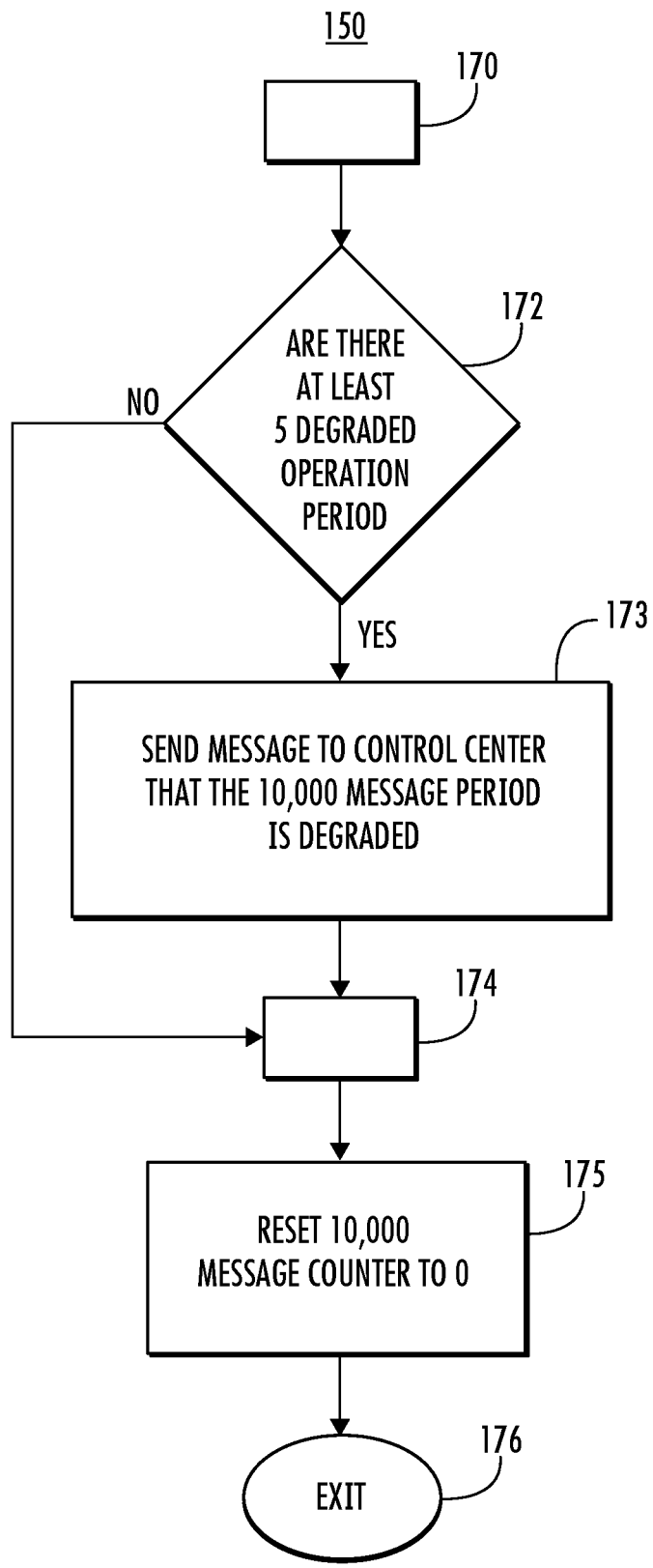

Referring to FIG. 7D, after the long-term performance value of 10,000 messages were completed, a decision is made in block 172 to analyze a system degradation table to determine if a minimum value of degradation parameters occurred in the degraded operation period. For example, the minimum value of a degradation parameters can be 5. When it is determined that the minimum value of a degradation parameters occurred, block 173 is executed to send a control message to a network control center that the long term performance value of the 10,000 messages is degraded. The control message can include the system degradation table. After block 173 and when it is determined that there are not at least the minimum value of degradation parameters in the message table the messages are forwarded by block 174 to block 175. Block 175 is executed and second counter 61b is reset to zero.

Third counter 61c has three sub-counters, which can be referred to as Fault Tolerance Counter (FTC), Retransmission Counter (RC) and Duplicate Transmission Counter (DTC). Blocks 162 and 172 are executed to determine whether system degradation was encountered during the message. If they were encountered, the respective sub-counter is incremented. The sub-counters are then reset. The values of the sub-counters are added together and if it is over a parameter set by the control center or a minimum of 50, then those entries in the table are flagged as system degradation parameters. Operating system 32 shown in FIG. 9 has the capabilities to do such additions.

FIG. 8 illustrates an embodiment of system 200 for sending duplicate messages to ensure accuracy of transmission of messages in a network including a plurality of applications and a control center. System 200 includes a plurality of clusters 12a1-12an for data application 210 and plurality of clusters 12b1-12bn for network control center 220. A plurality of connections 20 are connected to cluster 12a1-12an and clusters 12b1-12bn. Connections 20 can be 32 RS 232 connections. Multiplexed modems 22 at clusters 12a1-12an and clusters 12b1-12bn send and receive original messages 13 and duplicate messages 14. Clusters 12a1-12an can be directed to applications for a data application and clusters 12b1-12bn can be directed to applications at a control center. Clusters 12a1-12an communicates using wireless communications 25 to control clusters 12b1-12bn. For example, wireless communications can be a wireless packet data network, Internet connection or other wireless-based connection, including 4G and 5G networks.

In one embodiment, system 200 includes clusters 12a1 and 12a2 in order to be capable of having 64 processes for original message 13 and duplicate message 14. System 200 includes clusters 12b1 and 12b2 for receiving the same number of messages. In this embodiment there can be 128 on-going processes at the same time. Additional system level processes and diagnostic processes also could be operating at the same time. System 200 can be capable of handling approximately 200 on-going processes at the same time and approximately 200 timers and 200 counters can be operating on an on-going basis.

Figure 9:
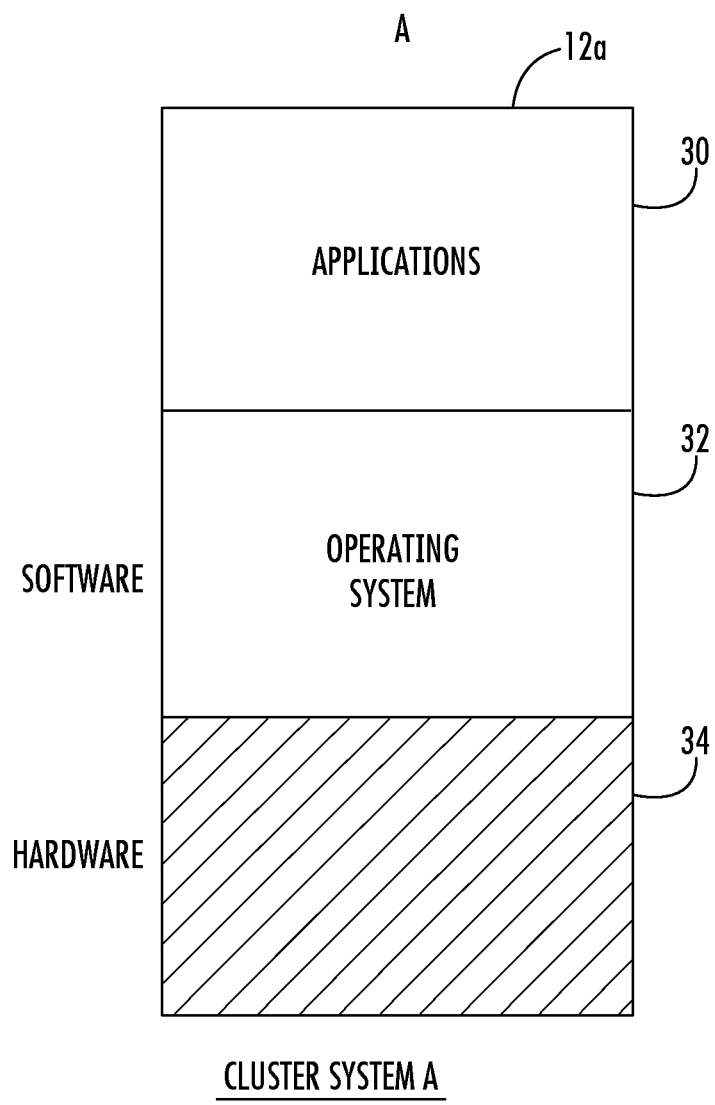
FIG. 9 is a schematic diagram of a cluster system used in the present invention.

Cluster 12 can have a software and hardware architecture as shown in FIG. 9. Software can include applications 30. The hardware architecture includes operating system 32. Operating system 32 can be a real-time software operating system. Operating system 32 in real time controls the acquisition of data from data points of the cluster, sends data through cellular modems to other clusters. Operating system 32 includes resources, including for example timers and counters. Applications 30 in programs in each cluster 12 can call on operating system 32 to implement functions and use resources.

Hardware 34 can include a computer processor. Hardware can be implemented as described in U.S. Pat. No. 8,787,202 hereby incorporated by reference in its entirety into this application.

Figure 10:
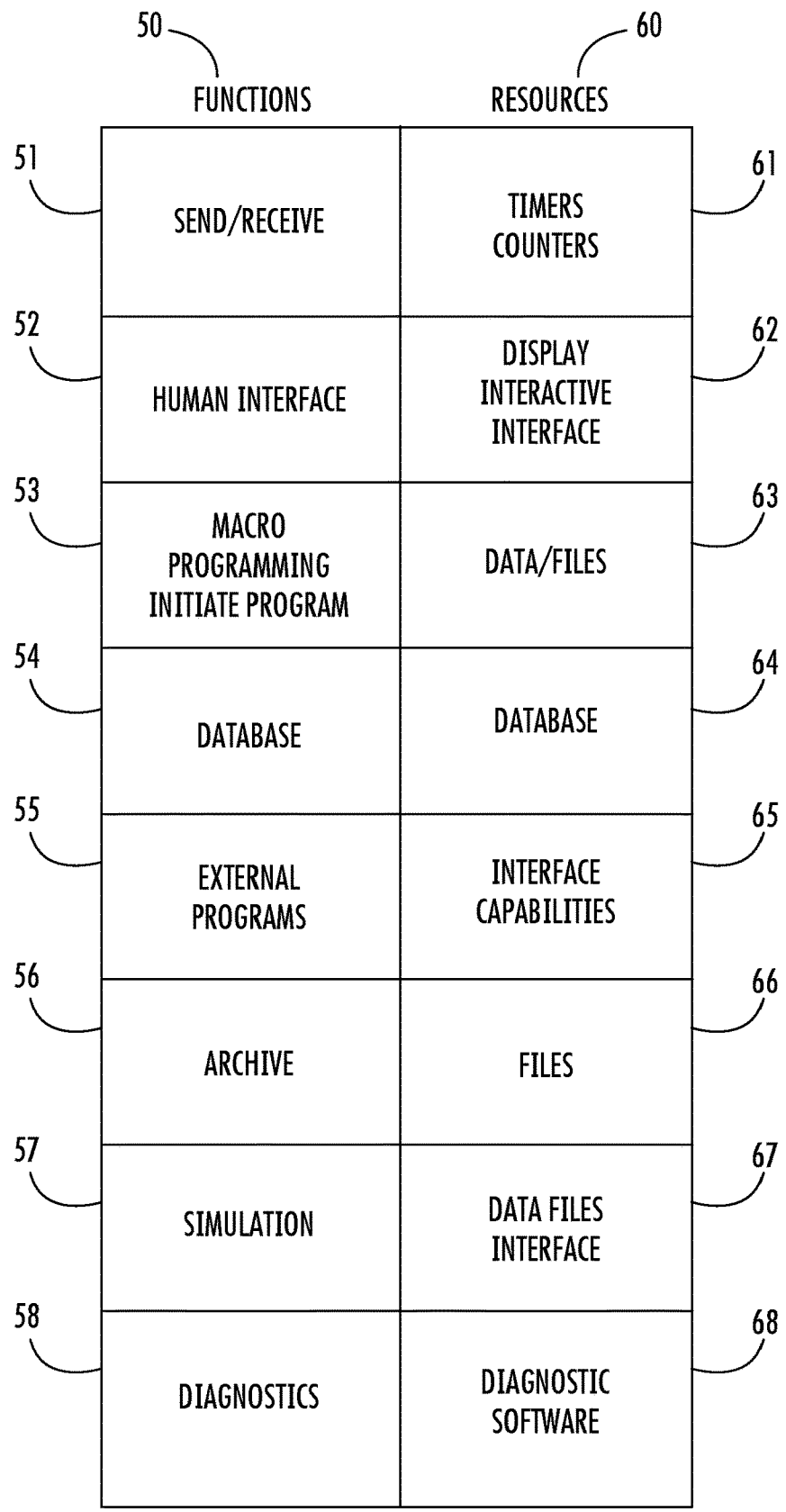
FIG. 10 is a schematic diagram of functions and resources of an operating system of the cluster system.

FIG. 10 is a schematic diagram of an implementation of operating system 32 including functions 50 and resources 60. Send and receive process 51 can be used for sending and receiving original messages 13 and duplicate messages 14. Send and receive process 51 can include initiating, terminating and resetting of timers and counters resource 61. Human interface process 52 can be used to control a human interface to applications which can be displayed on display interactive interface resource 62. Macro programming initiate process 53 can be used to initiate a process as a macro from a macro programming application for controlling data and files resource 63. Database process 54 can classify and use message information stored in database 64. External programs 55 can be used to access interface capabilities resource 65. Archive process 56 can be used to archive files in file resource 66 and data files interface 67. Simulation processes 57 can be used for processing the macros and archived data simultaneously with the other on-going functions. Diagnostic process 58 can be used to interface with diagnostic software function 68.

In one embodiment, a non-transitory computer readable storage medium is disclosed having computer readable code, the medium including instructions executable by one or more processors to perform operations, comprising: sending an original message using a wireless communications medium; waiting a delay time period after sending each of the original message, and when the original message has not completed in the delay time period, sending a duplicate message wherein the duplicate message is a duplicate of the original message.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections. Code may be written in any combination of programming languages or machine-readable data formats, each suitable to its particular application, including but not limited to: C, C++, Java, Python, Ruby, R, Lua, Lisp, Scala, JSON, JavaScript, YAML, XML, HTML, etc. Services may be RESTful and may be implemented using generic hooks, including over HTTP, HTTPS, SCTP, IP, TCP, JSON, JavaScript, etc., as well as via inter-process communication on one or more real or virtual machines or containers, e.g., IPC, shared memory, shared filesystem, UNIX pipes and the like. A Linux or POSIX environment may be used. A networking fabric may be provided among the different containers, in some embodiments. As is well-known, the benefit of using cloud infrastructure is that it is simple to mix heterogeneous resources and to scale services up or down based on load and desired performance.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals. To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The subject matter described in this specification can be implemented using client-side applications, web pages, mobile web pages, or other software as generally known in the art and that would be usable to end-user customers (for community self-managed RAN apps) and/or mobile operator end users. The subject matter could alternately be delivered or implemented using an API, such as a SOAP API, a JSON API, a RESTful API, in lieu of or in conjunction with a direct end-user interface. The subject matter could use messaging queues, webhooks, server-side containers, or any other technology known in the art.

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server. Any database could be used (SQL, NoSQL, temporal, key-value, etc.).

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for ensuring reliability and delay of a data communications application comprising the steps of:
    sending original messages using a wireless communications medium for transfer of the original messages from a source to a destination;
    waiting a delay time period after sending each of the original messages;
    when the transfer of each of the original messages from the source to the destination has not completed in the delay time period, sending a duplicate message wherein the duplicate message is a duplicate of the original message, the delay time period is 60 to 80% of a time period for completion of the transfer of the original messages from the source to the destination;
    and adjusting the delay time period after a predetermined interim message value and wherein when the transfer of each of the original messages from the source to the destination completes before the transfer of the duplicate message from the source to the destination completes, the duplicate message processing is terminated and wherein the interim message value is a value of a counter of original messages sent using the wireless communications medium.

2. The method of claim 1 wherein the interim message value in the counter is 1,000 of the original messages.

3. The method of claim 2 wherein the long-term performance value in the counter is 10,000 of the original messages.

4. The method of claim 2 wherein the delay time period is adjusted to less than 5% of duplicate messages complete the transfer of the duplicate message from the source to the destination before original messages complete the transfer of the duplicate message from the source to the destination.

5. The method of claim 1 wherein the delay time period is adjusted based on degradation feedback during a long term performance value, the degradation feedback comprising one or more of duplicate message completion of the transfer of the duplicate message from the source to the destination, fault tolerance and data retransmission.

6. The method of claim 5 further comprising the step of entering details of the original messages corrected by the duplicate message in a table of corrections during the interim message value.

7. The method of claim 6 further comprising the step of determining a degradation operating period by analyzing a system degradation table to determine occurrence a minimum value of degradation.

8. The method of claim 7 further comprising the step of sending a message to a network control center that a degradation occurred in the degradation period over the long term performance value.

9. The method of claim 7 wherein in the step of determining a degradation operating period sub counters of a Fault Tolerance Counter (FTC), a Retransmission Counter (RC) and a Duplicate Transmission Counter are updated when system degradation is encountered during the transfer of the original message from a source to a destination and the sub counters of the Fault Tolerance Counter (FTC), the Retransmission Counter (RC) and the Duplicate Transmission Counter are added together to determine a counter value and if the counter value is greater than a threshold parameter then corresponding entries in the system degradation table are flagged as system degradation parameters.

10. The method of claim 1 wherein a reliability level is less than 1 error in substantially 1 million message transmissions.

11. A system for ensuring reliability and delay of data communication application comprising:
    means for establishing communications using a wireless communication medium for transfer of the original message from a source to a destination;
    means for sending an original message using the wireless communications medium;
    means for waiting a delay time period after sending of the original message; and
    means for sending a duplicate message when transfer of the original message from the source to the destination has not completed in the delay time period wherein the duplicate message is a duplicate of the original message, the delay time period is 60 to 80% of a time period for completion of the transfer of the original message from the source to the destination and when the transfer of the original message from the source to the destination completes before the transfer of the duplicate message from the source to the destination completes the sending of the duplicate message is terminated, and means for adjusting the delay time period after a predetermined interim message value, the interim message value is a value of a counter of original messages sent using the wireless communications medium.

12. The system of claim 11 wherein the interim message value is 1,000 in a counter of the original messages sent using the wireless communications medium.

13. The system of claim 11 wherein the means for adjusting the delay time further comprises degradation feedback during a long term performance value, the degradation feedback comprising one or more of duplicate message completion of the transfer of the duplicate message from the source to the destination, fault tolerance and data retransmission.

14. The system of claim 13 wherein the long term performance value in the counter is 10,000 of the original messages.

15. The system of claim 11 further comprising means for entering details of the original messages corrected by the duplicate message in a corrections table during the interim message value and means for determining a degradation operating period by analyzing a system degradation table to determine occurrence a minimum value of degradation.

16. The system of claim 15 further comprising means for sending a message to a network control center that a degradation occurred in the degradation period over the long-term performance value.

* * * * *